US010527325B2

(12) United States Patent
Schroeder et al.

(10) Patent No.: US 10,527,325 B2
(45) Date of Patent: Jan. 7, 2020

(54) REFRIGERATOR APPLIANCE

(71) Applicant: Haier US Appliance Solutions, Inc., Wilmington, DE (US)

(72) Inventors: Michael Goodman Schroeder, Louisville, KY (US); Michael Alexander Benedict, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 277 days.

(21) Appl. No.: 15/471,201

(22) Filed: Mar. 28, 2017

(65) Prior Publication Data

US 2018/0283738 A1 Oct. 4, 2018

(51) Int. Cl.
*F25B 21/00* (2006.01)
*F25D 17/06* (2006.01)

(52) U.S. Cl.
CPC ............ *F25B 21/00* (2013.01); *F25D 17/065* (2013.01); *F25B 2321/0021* (2013.01); *Y02B 30/66* (2013.01)

(58) Field of Classification Search
CPC ................ F25B 1/00; F25B 2321/0021; F25B 2321/0023; F25B 2321/00; F25B 2321/022; F25B 21/00; F25D 17/065; F25D 11/00; Y02B 30/66
See application file for complete search history.

(56) References Cited

U.S. PATENT DOCUMENTS

| 668,560 A | 2/1901 | Fulner et al. |
| 1,985,455 A | 12/1934 | Mosby |
| 2,671,929 A | 3/1954 | Gayler |
| 2,765,633 A | 10/1956 | Muffly |
| 3,618,265 A | 11/1971 | Croop |
| 3,816,029 A | 6/1974 | Bowen et al. |
| 3,956,076 A | 5/1976 | Powell, Jr. et al. |
| 4,037,427 A | 7/1977 | Kramer |
| 4,102,655 A | 7/1978 | Jeffery et al. |

(Continued)

FOREIGN PATENT DOCUMENTS

| CA | 2893874 A1 | 6/2014 |
| CA | 2919117 A1 | 1/2015 |

(Continued)

OTHER PUBLICATIONS

International Search Report issued in connection with PCT Application No. PCT/US2014/042485 dated Oct. 23, 2014.

(Continued)

*Primary Examiner* — Elizabeth J Martin
(74) *Attorney, Agent, or Firm* — Dority & Manning, P.A.

(57) ABSTRACT

A refrigerator appliance includes a cold side heat exchanger positioned within a cabinet such that a fresh food chamber and a freezer chamber are chillable with air from the cold side heat exchanger. A regenerator housing is connected to the cold side heat exchanger such that working fluid is flowable from the regenerator housing to the cold side heat exchanger. The working fluid is flowable through a caloric material within the regenerator housing. The refrigerator appliance also includes features for drawing the working fluid from the regenerator housing at a plurality of locations along the length of the caloric material.

20 Claims, 9 Drawing Sheets

(56) References Cited

U.S. PATENT DOCUMENTS

| | | |
|---|---|---|
| 4,107,935 A | 8/1978 | Steyert, Jr. |
| 4,197,709 A | 4/1980 | Hochstein |
| 4,200,680 A | 4/1980 | Sasazawa et al. |
| 4,259,843 A | 4/1981 | Kausch |
| 4,507,927 A | 4/1985 | Barclay |
| 4,507,928 A | 4/1985 | Johnson |
| 4,549,155 A | 10/1985 | Halbach |
| 4,554,790 A | 11/1985 | Nakagome et al. |
| 4,557,228 A | 12/1985 | Samodovitz |
| 4,599,866 A | 7/1986 | Nakagome et al. |
| 4,625,519 A | 12/1986 | Hakuraku et al. |
| 4,642,994 A | 2/1987 | Barclay et al. |
| 4,735,062 A | 4/1988 | Woolley et al. |
| 4,741,175 A | 5/1988 | Schulze |
| 4,785,636 A | 11/1988 | Hakuraku et al. |
| 4,796,430 A | 1/1989 | Malaker et al. |
| 5,091,361 A | 2/1992 | Hed |
| 5,156,003 A | 10/1992 | Yoshiro et al. |
| 5,190,447 A | 3/1993 | Schneider |
| 5,249,424 A | 10/1993 | DeGregoria et al. |
| 5,336,421 A | 8/1994 | Kurita et al. |
| 5,351,791 A | 10/1994 | Rosenzweig |
| 5,465,781 A | 11/1995 | DeGregoria |
| 5,599,177 A | 2/1997 | Hetherington |
| 5,661,895 A | 9/1997 | Irgens |
| 5,718,570 A | 2/1998 | Beckett et al. |
| 5,934,078 A | 8/1999 | Lawton, Jr. et al. |
| 6,332,323 B1 | 12/2001 | Reid et al. |
| 6,423,255 B1 | 7/2002 | Hoechsmann et al. |
| 6,446,441 B1 | 9/2002 | Dean |
| 6,467,274 B2 | 10/2002 | Barclay et al. |
| 6,526,759 B2 | 3/2003 | Zimm et al. |
| 6,588,215 B1 | 7/2003 | Ghoshal |
| 6,612,816 B1 | 9/2003 | Vanden Brande et al. |
| 6,668,560 B2 | 12/2003 | Zimm et al. |
| 6,826,915 B2 | 12/2004 | Wada et al. |
| 6,840,302 B1 | 1/2005 | Tanaka et al. |
| 6,915,647 B2 | 7/2005 | Tsuchikawa et al. |
| 6,935,121 B2 | 8/2005 | Fang et al. |
| 6,946,941 B2 | 9/2005 | Chell |
| 6,971,245 B2 | 12/2005 | Kuroyanagi |
| 7,148,777 B2 | 12/2006 | Chell et al. |
| 7,297,270 B2 | 11/2007 | Bernard et al. |
| 7,313,926 B2 | 1/2008 | Gurin |
| 7,481,064 B2 | 1/2009 | Kitanovski et al. |
| 7,552,592 B2 | 6/2009 | Iwasaki et al. |
| 7,644,588 B2 | 1/2010 | Shin et al. |
| 7,863,789 B2 | 1/2011 | Zepp et al. |
| 7,897,898 B2 | 3/2011 | Muller et al. |
| 7,938,632 B2 | 5/2011 | Smith |
| 8,061,147 B2 | 11/2011 | Dinesen et al. |
| 8,069,662 B1 | 12/2011 | Albert |
| 8,099,964 B2 | 1/2012 | Saito et al. |
| 8,174,245 B2 | 5/2012 | Carver |
| 8,191,375 B2 | 6/2012 | Sari et al. |
| 8,209,988 B2 | 7/2012 | Zhang et al. |
| 8,216,396 B2 | 7/2012 | Dooley et al. |
| 8,310,325 B2 | 11/2012 | Zhang et al. |
| 8,375,727 B2 | 2/2013 | Sohn |
| 8,378,769 B2 | 2/2013 | Heitzler et al. |
| 8,448,453 B2 | 5/2013 | Bahl et al. |
| 8,551,210 B2 | 10/2013 | Reppel et al. |
| 8,596,084 B2 | 12/2013 | Herrera et al. |
| 8,616,009 B2 | 12/2013 | Dinesen et al. |
| 8,656,725 B2 | 2/2014 | Muller et al. |
| 8,695,354 B2 | 4/2014 | Heitzler et al. |
| 8,729,718 B2 | 5/2014 | Kuo et al. |
| 8,763,407 B2 | 7/2014 | Carroll et al. |
| 8,769,966 B2 | 7/2014 | Heitzler et al. |
| 8,869,541 B2 | 10/2014 | Heitzler et al. |
| 8,904,806 B2 | 12/2014 | Cramet et al. |
| 8,935,927 B2 | 1/2015 | Kobayashi et al. |
| 8,978,391 B2 | 3/2015 | Muller et al. |
| 9,175,885 B2 | 11/2015 | Katter |
| 9,245,673 B2 | 1/2016 | Carroll et al. |
| 9,377,221 B2 | 6/2016 | Benedict |
| 9,400,126 B2 | 7/2016 | Takahashi et al. |
| 9,523,519 B2 | 12/2016 | Muller |
| 9,534,817 B2 | 1/2017 | Benedict et al. |
| 9,548,151 B2 | 1/2017 | Muller |
| 9,599,374 B2 | 3/2017 | Takahashi et al. |
| 9,631,843 B2 | 4/2017 | Benedict |
| 9,702,594 B2 | 7/2017 | Vetrovec |
| 9,739,510 B2 | 8/2017 | Hassen |
| 9,797,630 B2 | 10/2017 | Benedict et al. |
| 9,810,454 B2 | 11/2017 | Tasaki et al. |
| 9,857,105 B1 | 1/2018 | Schroeder et al. |
| 9,857,106 B1 | 1/2018 | Schroeder et al. |
| 9,927,155 B2 | 3/2018 | Boeder et al. |
| 9,978,487 B2 | 5/2018 | Katter et al. |
| 10,006,675 B2 | 6/2018 | Benedict et al. |
| 10,018,385 B2 | 7/2018 | Radermacher et al. |
| 2002/0040583 A1 | 4/2002 | Barclay et al. |
| 2002/0066368 A1 | 6/2002 | Zornes |
| 2002/0087120 A1 | 7/2002 | Rogers et al. |
| 2003/0010054 A1 | 1/2003 | Esch et al. |
| 2003/0051774 A1 | 3/2003 | Saito |
| 2004/0093877 A1 | 5/2004 | Wada |
| 2004/0182086 A1 | 9/2004 | Chiang et al. |
| 2004/0187510 A1 | 9/2004 | Jung |
| 2004/0187803 A1 | 9/2004 | Regev |
| 2004/0250550 A1 | 12/2004 | Bruck |
| 2005/0017394 A1 | 1/2005 | Hochsmann et al. |
| 2005/0109490 A1 | 5/2005 | Harmon et al. |
| 2005/0274676 A1 | 12/2005 | Kumar et al. |
| 2006/0130518 A1 | 6/2006 | Kang et al. |
| 2006/0231163 A1 | 10/2006 | Hirosawa et al. |
| 2007/0130960 A1 | 6/2007 | Muller et al. |
| 2007/0220901 A1 | 9/2007 | Kobayashi |
| 2008/0236171 A1 | 10/2008 | Saito et al. |
| 2008/0236175 A1 | 10/2008 | Chaparro Monferrer et al. |
| 2008/0303375 A1 | 12/2008 | Carver |
| 2009/0091411 A1 | 4/2009 | Zhang et al. |
| 2009/0158749 A1 | 6/2009 | Sandeman |
| 2009/0217674 A1 | 9/2009 | Kaji et al. |
| 2009/0236930 A1 | 9/2009 | Nashiki |
| 2009/0266083 A1 | 10/2009 | Shin et al. |
| 2009/0308080 A1 | 12/2009 | Han et al. |
| 2010/0000228 A1* | 1/2010 | Wiest ............... F25B 21/00 62/3.1 |
| 2010/0058775 A1 | 3/2010 | Kaji et al. |
| 2010/0071383 A1 | 3/2010 | Zhang et al. |
| 2010/0116471 A1 | 5/2010 | Reppel |
| 2010/0122488 A1 | 5/2010 | Fukai |
| 2010/0150747 A1 | 6/2010 | Mehta et al. |
| 2010/0162747 A1 | 7/2010 | Hamel et al. |
| 2010/0209084 A1 | 8/2010 | Nelson et al. |
| 2010/0236258 A1 | 9/2010 | Heitzler et al. |
| 2010/0276627 A1 | 11/2010 | Mazet |
| 2010/0303917 A1 | 12/2010 | Watson et al. |
| 2011/0000206 A1 | 1/2011 | Aprad |
| 2011/0042608 A1 | 2/2011 | Reesink |
| 2011/0048031 A1 | 3/2011 | Barve |
| 2011/0048690 A1 | 3/2011 | Reppel et al. |
| 2011/0058795 A1 | 3/2011 | Kleman et al. |
| 2011/0061398 A1 | 3/2011 | Shih et al. |
| 2011/0062821 A1 | 3/2011 | Chang et al. |
| 2011/0082026 A1 | 4/2011 | Sakatani et al. |
| 2011/0094243 A1 | 4/2011 | Carroll et al. |
| 2011/0162388 A1 | 7/2011 | Barve et al. |
| 2011/0168363 A9 | 7/2011 | Reppel et al. |
| 2011/0173993 A1 | 7/2011 | Muller et al. |
| 2011/0182086 A1 | 7/2011 | Mienko et al. |
| 2011/0192836 A1 | 8/2011 | Muller et al. |
| 2011/0218921 A1 | 9/2011 | Addala et al. |
| 2011/0239662 A1 | 10/2011 | Bahl et al. |
| 2011/0284196 A1 | 11/2011 | Zanadi |
| 2011/0302931 A1 | 12/2011 | Sohn |
| 2011/0308258 A1 | 12/2011 | Smith et al. |
| 2011/0314836 A1 | 12/2011 | Heitzler et al. |
| 2012/0031108 A1 | 2/2012 | Kobayashi et al. |
| 2012/0033002 A1 | 2/2012 | Seeler et al. |
| 2012/0036868 A1 | 2/2012 | Heitzler et al. |
| 2012/0045698 A1 | 2/2012 | Shima |

(56) References Cited

U.S. PATENT DOCUMENTS

| | | | |
|---|---|---|---|
| 2012/0060526 A1* | 3/2012 | May | F25D 29/00 62/115 |
| 2012/0079834 A1 | 4/2012 | Dinesen | |
| 2012/0222427 A1 | 9/2012 | Hassen | |
| 2012/0222428 A1 | 9/2012 | Celik et al. | |
| 2012/0266591 A1 | 10/2012 | Morimoto et al. | |
| 2012/0266607 A1 | 10/2012 | Morimoto et al. | |
| 2012/0267090 A1 | 10/2012 | Kruglick | |
| 2012/0272665 A1 | 11/2012 | Watanabe et al. | |
| 2012/0272666 A1 | 11/2012 | Watanabe | |
| 2012/0285179 A1 | 11/2012 | Morimoto | |
| 2012/0291453 A1 | 11/2012 | Watanabe et al. | |
| 2013/0019610 A1 | 1/2013 | Zimm et al. | |
| 2013/0020529 A1 | 1/2013 | Chang et al. | |
| 2013/0104568 A1 | 5/2013 | Kuo et al. | |
| 2013/0106116 A1 | 5/2013 | Kuo et al. | |
| 2013/0145573 A1 | 6/2013 | Bizhanzadeh | |
| 2013/0180263 A1 | 7/2013 | Choi et al. | |
| 2013/0186107 A1 | 7/2013 | Shih et al. | |
| 2013/0187077 A1 | 7/2013 | Katter | |
| 2013/0192269 A1 | 8/2013 | Wang | |
| 2013/0199460 A1 | 8/2013 | Duplessis et al. | |
| 2013/0227965 A1 | 9/2013 | Yagi et al. | |
| 2013/0232993 A1 | 9/2013 | Saito et al. | |
| 2013/0255279 A1 | 10/2013 | Tomimatsu et al. | |
| 2013/0269367 A1 | 10/2013 | Meillan | |
| 2013/0298571 A1 | 11/2013 | Morimoto et al. | |
| 2013/0300243 A1 | 11/2013 | Gieras et al. | |
| 2013/0319012 A1 | 12/2013 | Kuo et al. | |
| 2013/0327062 A1 | 12/2013 | Watanabe et al. | |
| 2014/0020881 A1 | 1/2014 | Reppel et al. | |
| 2014/0075958 A1 | 3/2014 | Takahashi et al. | |
| 2014/0116538 A1 | 5/2014 | Tanaka et al. | |
| 2014/0165594 A1 | 6/2014 | Benedict | |
| 2014/0165595 A1 | 6/2014 | Zimm et al. | |
| 2014/0190182 A1* | 7/2014 | Benedict | F25B 21/00 62/3.1 |
| 2014/0216057 A1 | 8/2014 | Oezcan | |
| 2014/0260373 A1 | 9/2014 | Gerber et al. | |
| 2014/0290273 A1 | 10/2014 | Benedict et al. | |
| 2014/0290275 A1 | 10/2014 | Muller | |
| 2014/0291570 A1 | 10/2014 | Klausner et al. | |
| 2014/0305137 A1 | 10/2014 | Benedict | |
| 2014/0305139 A1 | 10/2014 | Takahashi et al. | |
| 2014/0325996 A1 | 11/2014 | Muller | |
| 2014/0366557 A1 | 12/2014 | Mun et al. | |
| 2015/0007582 A1 | 1/2015 | Kim et al. | |
| 2015/0027133 A1 | 1/2015 | Benedict | |
| 2015/0030483 A1 | 1/2015 | Ryu | |
| 2015/0033762 A1 | 2/2015 | Cheng et al. | |
| 2015/0033763 A1 | 2/2015 | Saito et al. | |
| 2015/0047371 A1 | 2/2015 | Hu et al. | |
| 2015/0068219 A1 | 3/2015 | Komorowski et al. | |
| 2015/0089960 A1 | 4/2015 | Takahashi et al. | |
| 2015/0114007 A1 | 4/2015 | Neilson et al. | |
| 2015/0168030 A1 | 6/2015 | Leonard et al. | |
| 2015/0211440 A1 | 7/2015 | Joffroy | |
| 2015/0260433 A1 | 9/2015 | Choi et al. | |
| 2015/0267943 A1 | 9/2015 | Kim et al. | |
| 2015/0362225 A1 | 12/2015 | Schwartz | |
| 2015/0369524 A1 | 12/2015 | Ikegami et al. | |
| 2016/0000999 A1 | 1/2016 | Focht et al. | |
| 2016/0032920 A1 | 2/2016 | Hatami Aghdam | |
| 2016/0084544 A1 | 3/2016 | Radermacher et al. | |
| 2016/0091227 A1 | 3/2016 | Leonard et al. | |
| 2016/0216012 A1 | 7/2016 | Benedict et al. | |
| 2016/0238287 A1 | 8/2016 | Benedict | |
| 2016/0273811 A1 | 9/2016 | Smith et al. | |
| 2016/0282021 A1 | 9/2016 | Zhao et al. | |
| 2016/0355898 A1 | 12/2016 | Vieyra Villegas et al. | |
| 2016/0356529 A1 | 12/2016 | Humburg | |
| 2016/0367982 A1 | 12/2016 | Pennie | |
| 2017/0059213 A1 | 3/2017 | Barclay et al. | |
| 2017/0071234 A1 | 3/2017 | Garg | |
| 2017/0138648 A1 | 5/2017 | Cui et al. | |
| 2017/0176083 A1 | 6/2017 | Sul et al. | |
| 2017/0328603 A1 | 11/2017 | Barclay et al. | |
| 2017/0328649 A1 | 11/2017 | Brandmeier | |
| 2017/0370624 A1 | 12/2017 | Zimm et al. | |
| 2018/0005735 A1 | 1/2018 | Scharf et al. | |
| 2018/0023852 A1 | 1/2018 | Schroeder et al. | |
| 2018/0195775 A1 | 7/2018 | Schroeder et al. | |
| 2018/0283740 A1 | 10/2018 | Holladay et al. | |

FOREIGN PATENT DOCUMENTS

| | | |
|---|---|---|
| CN | 101979937 A | 2/2011 |
| CN | 201772566 U | 3/2011 |
| CN | 101788207 B | 9/2011 |
| CN | 202432596 U | 9/2012 |
| CN | 103090583 A | 5/2013 |
| CN | 103712401 A | 4/2014 |
| CN | 102077303 B | 4/2015 |
| CN | 106481842 A | 3/2017 |
| DE | 102013223959 A1 | 5/2015 |
| DE | 20201506851 U1 | 3/2016 |
| EP | 0187078 A1 | 7/1986 |
| EP | 2071255 A1 | 6/2009 |
| EP | 2108904 A1 | 10/2009 |
| EP | 2215955 A1 | 8/2010 |
| EP | 2322072 A2 | 5/2011 |
| EP | 2420760 A1 | 2/2012 |
| EP | 3306082 A2 | 4/2018 |
| FR | 2935468 A1 | 3/2010 |
| JP | 59232922 | 12/1984 |
| JP | H08166182 A | 6/1996 |
| JP | 3205196 B2 | 9/2001 |
| JP | 2002315243 A | 10/2002 |
| JP | 2007147136 A | 6/2007 |
| JP | 2007291437 A | 11/2007 |
| JP | 2008051412 A | 3/2008 |
| JP | 2010112606 A | 5/2010 |
| JP | 2010525291 A | 7/2010 |
| JP | 6212955 B2 | 12/2014 |
| JP | 2014228216 A | 12/2014 |
| JP | 5907023 B2 | 4/2016 |
| JP | 6079498 B2 | 2/2017 |
| JP | 6191539 B2 | 9/2017 |
| JP | 2017207222 A | 11/2017 |
| KR | 101100301 B1 | 12/2011 |
| KR | 1238234 B1 | 3/2013 |
| WO | WO 0212800 A1 | 2/2002 |
| WO | WO 03016794 A1 | 2/2003 |
| WO | WO 2004/068512 | 8/2004 |
| WO | WO 2007/036729 A1 | 4/2007 |
| WO | WO 2009/024412 | 2/2009 |
| WO | WO2010/119591 A1 | 10/2010 |
| WO | WO 2011034594 A1 | 3/2011 |
| WO | WO 2014099199 A1 | 6/2014 |
| WO | WO 2014170447 A1 | 10/2014 |
| WO | WO 2014173787 A1 | 10/2014 |
| WO | WO 2015017230 A1 | 2/2015 |
| WO | WO2016035267 A1 | 3/2016 |
| WO | WO 2017042266 A1 | 3/2017 |
| WO | WO2017097989 A1 | 6/2017 |

OTHER PUBLICATIONS

International Search Report issued in connection with PCT Application No. PCT/US2014/017431 dated May 9, 2014.

International search report issued in connection with PCT/US2013/070518, dated Jan. 22, 2014.

Tetsuji Okamura, Performance of a room-temperature rotary magnet refrigerator, dated Nov. 28, 2005, Elsevier.

Journal of Alloys and Compounds, copyright 2008 Elsevier B..V. Evaluation of Ni—Mn—In—Si Alloys for Magnetic Refrigerant Application, Rahul Das, A. Perumal and A. Srinivasan, Dept of Physics, Indian Institute of Technology, Oct. 10, 2011.

Effects of annealing on the magnetic entropy change and exchange bias behavior in melt-spun Ni—Mn—In ribbons, X.Z. Zhao, C.C. Hsieh, et al Science Direct, Scripta Materialia 63 (2010).

(56) References Cited

OTHER PUBLICATIONS

PCT International Search Report and Written Opinion issued in connection with PCT Application No. PCT/US2013/070023 dated Feb. 27, 2014.
Barbara Pulko, Epoxy-bonded La—Fe—Co—Si magnetocaloric plates, Journal of Magnetism and Magnetic Materials, 375 (2015) 65-73.
International Search Report of PCT/US2014/047925 dated Nov. 10, 2014.
C Aprea, et al., An innovative rotary permanent magnet magnetic refrigerator based on AMR cycle, Thermal Energy Systems: Production, Storage, Utilization and the Environment, dated May 2015, Napoli, Italy, pp. 1-5.
Andrej Kitanovski, Present and future caloric refrigeration and heat-pump technologies, International Journal of Refrigeration, vol. 57, Sep. 2015, pp. 288-298.
Stefano Dall'Olio, et al., Numerical Simulation of a Tapered Bed AMR, Technical University of Denmark, 2015, 2 pages.

\* cited by examiner

REFRIGERATOR APPLIANCE

FIELD OF THE INVENTION

The present subject matter relates generally to heat pumps, such as magneto-caloric heat pumps, for refrigerator appliances.

BACKGROUND OF THE INVENTION

Conventional refrigeration technology typically utilizes a heat pump that relies on compression and expansion of a fluid refrigerant to receive and reject heat in a cyclic manner so as to effect a desired temperature change or transfer heat energy from one location to another. This cycle can be used to receive heat from a refrigeration compartment and reject such heat to the environment or a location that is external to the compartment. Other applications include air conditioning of residential or commercial structures. A variety of different fluid refrigerants have been developed that can be used with the heat pump in such systems.

While improvements have been made to such heat pump systems that rely on the compression of fluid refrigerant, at best such can still only operate at about forty-five percent or less of the maximum theoretical Carnot cycle efficiency. Also, some fluid refrigerants have been discontinued due to environmental concerns. The range of ambient temperatures over which certain refrigerant-based systems can operate may be impractical for certain locations. Other challenges with heat pumps that use a fluid refrigerant exist as well.

Magneto-caloric materials (MCMs), i.e. materials that exhibit the magneto-caloric effect, provide a potential alternative to fluid refrigerants for heat pump applications. In general, the magnetic moments of MCMs become more ordered under an increasing, externally applied magnetic field and cause the MCMs to generate heat. Conversely, decreasing the externally applied magnetic field allows the magnetic moments of the MCMs to become more disordered and allow the MCMs to absorb heat. Some MCMs exhibit the opposite behavior, i.e. generating heat when the magnetic field is removed (which are sometimes referred to as para-magneto-caloric material but both types are referred to collectively herein as magneto-caloric material or MCM). The theoretical Carnot cycle efficiency of a refrigeration cycle based on an MCMs can be significantly higher than for a comparable refrigeration cycle based on a fluid refrigerant. As such, a heat pump system that can effectively use an MCM would be useful.

Challenges exist to the practical and cost competitive use of an MCM, however. In addition to the development of suitable MCMs, equipment that can attractively utilize an MCM is still needed. Currently proposed equipment may require relatively large and expensive magnets, may be impractical for use in e.g., appliance refrigeration, and may not otherwise operate with enough efficiency to justify capital cost.

Accordingly, a heat pump system that can address certain challenges, such as those identified above, would be useful. Such a heat pump system that can also be used in a refrigerator appliance would also be useful.

BRIEF DESCRIPTION OF THE INVENTION

The present subject matter provides a refrigerator appliance. The refrigerator appliance includes a cold side heat exchanger positioned within a cabinet such that a fresh food chamber and a freezer chamber are chillable with air from the cold side heat exchanger. A regenerator housing is connected to the cold side heat exchanger such that working fluid is flowable from the regenerator housing to the cold side heat exchanger. The working fluid is flowable through a caloric material within the regenerator housing. The refrigerator appliance also includes features for drawing the working fluid from the regenerator housing at a plurality of locations along the length of the caloric material. Additional aspects and advantages of the invention will be set forth in part in the following description, or may be apparent from the description, or may be learned through practice of the invention.

In a first exemplary embodiment, a refrigerator appliance is provided. The refrigerator appliance includes a cabinet that defines a fresh food chamber and a freezer chamber. A cold side heat exchanger is positioned within the cabinet such that the fresh food chamber and the freezer chamber are chillable with air from the cold side heat exchanger. A regenerator housing has a first cold side connection and a second cold side connection. The first cold side connection is separate from the second cold side connection on the regenerator housing. A caloric material is disposed within the regenerator housing. Working fluid is flowable through the caloric material within the regenerator housing. The working fluid is flowable from the regenerator housing to the cold side heat exchanger through either the first cold side connection or the second cold side connection.

In a second exemplary embodiment, a refrigerator appliance is provided. The refrigerator appliance includes a cabinet that defines a fresh food chamber and a freezer chamber. A cold side heat exchanger is positioned within the cabinet such that the fresh food chamber and the freezer chamber are chillable with air from the cold side heat exchanger. The refrigerator appliance also includes a regenerator housing. A caloric material is disposed within the regenerator housing. The caloric material has a length. The regenerator housing is connected to the cold side heat exchanger such that working fluid is flowable from the regenerator housing to the cold side heat exchanger. The working fluid is flowable through the caloric material within the regenerator housing. The refrigerator appliance also includes means for drawing the working fluid from the regenerator housing at a plurality of locations along the length of the caloric material.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
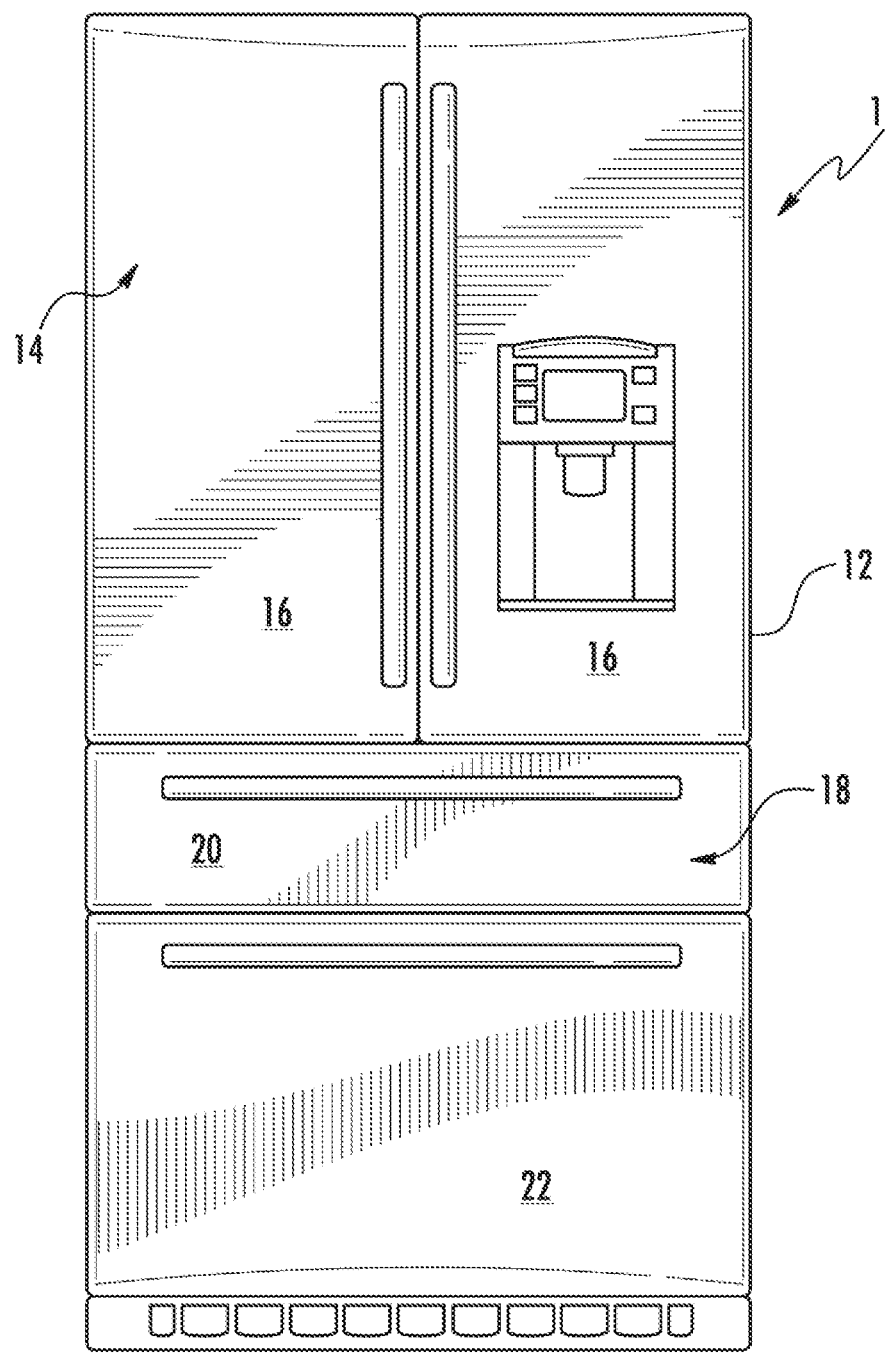
FIG. 1 is a refrigerator appliance in accordance with an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present subject matter is directed to a caloric heat pump system for heating or cooling an appliance, such as a refrigerator appliance. While described in greater detail below in the context of a magneto-caloric heat pump system, one of skill in the art using the teachings herein will recognize that other suitable caloric materials may be used in a similar manner to heat or cool an appliance, i.e., apply a field, move heat, remove the field, move heat. For example, electro-caloric material heats up and cools down within increasing and decreasing electric fields. As another example, elasto-caloric material heats up and cools down when exposed to increasing and decreasing mechanical strain. As yet another example, baro-caloric material heats up and cools down when exposed to increasing and decreasing pressure. Such materials and other similar caloric materials may be used in place of or in addition to the magneto-caloric material described below to heat or cool liquid/water within an appliance. Thus, caloric material is used broadly herein to encompass materials that undergo heating or cooling when exposed to a changing field from a field generator, where the field generator may be a magnet, an electric field generator, an actuator for applying mechanical stress or pressure, etc.

Referring now to FIG. 1, an exemplary embodiment of a refrigerator appliance 10 is depicted as an upright refrigerator having a cabinet or casing 12 that defines a number of internal storage compartments or chilled chambers. In particular, refrigerator appliance 10 includes upper fresh-food compartments 14 having doors 16 and lower freezer compartment 18 having upper drawer 20 and lower drawer 22. Drawers 20, 22 are "pull-out" type drawers in that they can be manually moved into and out of freezer compartment 18 on suitable slide mechanisms. Refrigerator 10 is provided by way of example only. Other configurations for a refrigerator appliance may be used as well including appliances with only freezer compartments, only chilled compartments, or other combinations thereof different from that shown in FIG. 1. In addition, the heat pump and heat pump system of the present disclosure is not limited to refrigerator appliances and may be used in other applications as well such as e.g., air-conditioning, electronics cooling devices, and others. Thus, it should be understood that while the use of a heat pump and heat pump system to provide cooling within a refrigerator is provided by way of example herein, the present disclosure may also be used to provide for heating applications as well.

Figure 2:
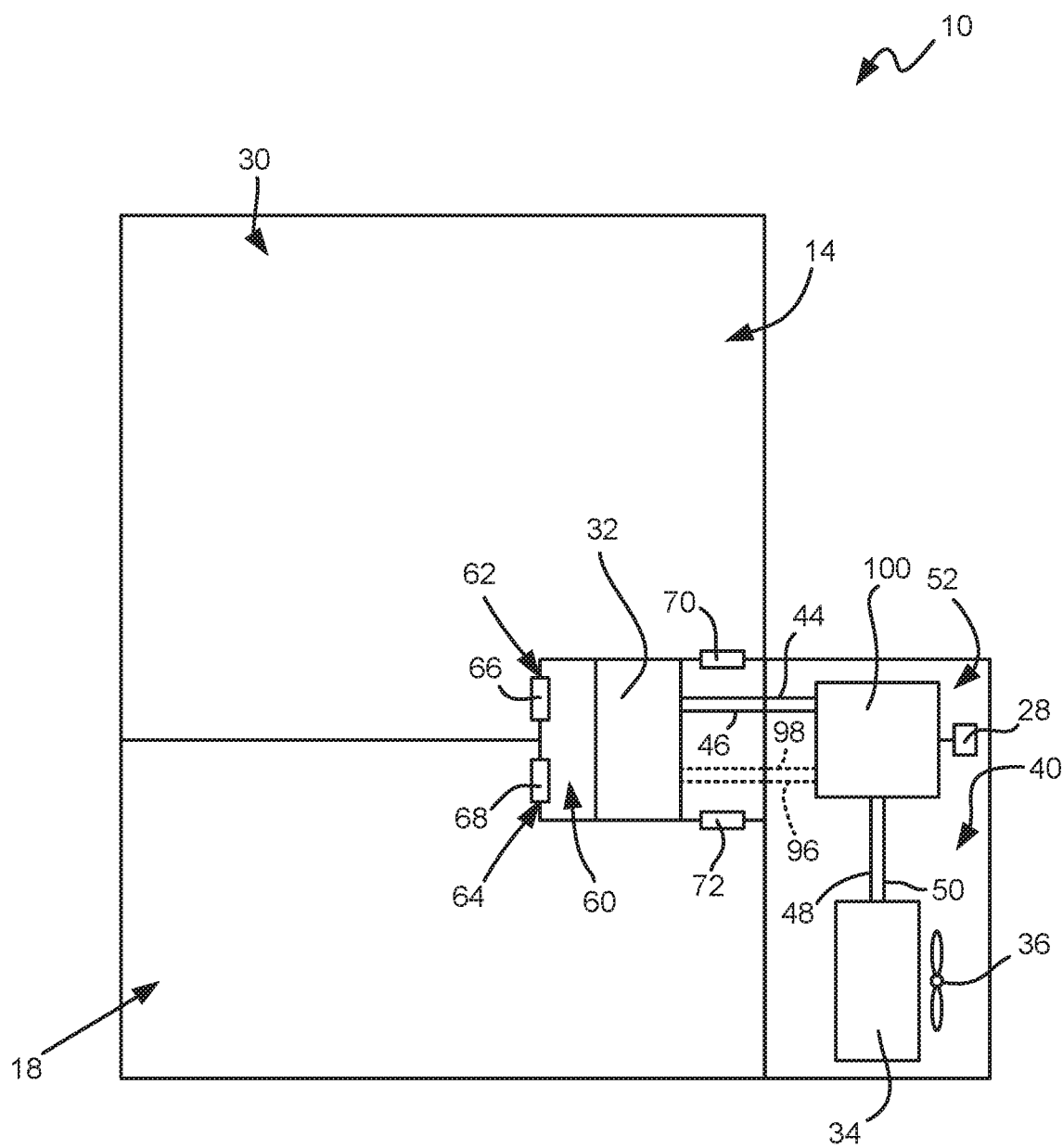
FIG. 2 is a schematic illustration of certain components of a heat pump system positioned in the exemplary refrigerator appliance of FIG. 1.

FIG. 2 is a schematic view of various components of refrigerator appliance 10, including refrigeration compartments 30 (e.g., fresh-food compartments 14 and freezer compartment 18) and a machinery compartment 40. Refrigeration compartment 30 and machinery compartment 40 include a heat pump system 52 having a first or cold side heat exchanger 32 positioned in refrigeration compartment 30 for the removal of heat therefrom. A heat transfer fluid such as e.g., an aqueous solution, flowing within cold side heat exchanger 32 receives heat from refrigeration compartment 30 thereby cooling contents of refrigeration compartment 30.

The heat transfer fluid flows out of cold side heat exchanger 32 by line 44 to heat pump 100. As will be further described herein, the heat transfer fluid receives additional heat from magneto-caloric material (MCM) in heat pump 100 and carries this heat by line 48 to second or hot side heat exchanger 34. Heat is released to the environment, machinery compartment 40, and/or other location external to refrigeration compartment 30 using second heat exchanger 34. A fan 36 may be used to create a flow of air across second heat exchanger 34 and thereby improve the rate of heat transfer to the environment. A pump or pumps (not shown) cause the heat transfer fluid to recirculate in heat pump system 52. Motor 28 is in mechanical communication with heat pump 100 and is operable to provide relative motion between a field generator and a regenerator housing of heat pump 100, as discussed in greater detail below.

From second heat exchanger 34, the heat transfer fluid returns by line 50 to heat pump 100 where, as will be further described below, the heat transfer fluid loses heat to the MCM in heat pump 100. The now colder heat transfer fluid flows by line 46 to cold side heat exchanger 32 to receive heat from refrigeration compartment 30 and repeat the cycle as just described.

Heat pump system 52 is provided by way of example only. Other configurations of heat pump system 52 may be used as well. For example, lines 44, 46, 48, and 50 provide fluid communication between the various components of heat pump system 52 but other heat transfer fluid recirculation loops with different lines and connections may also be employed. Still other configurations of heat pump system 52 may be used as well.

In certain exemplary embodiments, cold side heat exchanger 32 is the only heat exchanger within heat pump system 52 that is configured to cool refrigeration compartments 30. Thus, cold side heat exchanger 32 may be the only heat exchanger within cabinet 12 for cooling fresh-food compartments 14 and freezer compartment 18. Refrigerator appliance 10 also includes features for regulating air flow across cold side heat exchanger 32 and to fresh-food compartments 14 and freezer compartment 18.

As may be seen in FIG. 2, cold side heat exchanger 32 is positioned within a heat exchanger compartment 60 that is defined within cabinet 12, e.g., between fresh-food compartments 14 and freezer compartment 18. Fresh-food compartment 14 is contiguous with heat exchanger compartment 60 through a fresh food duct 62. Thus, air may flow between fresh-food compartment 14 and heat exchanger compartment 60 via fresh food duct 62. Freezer compartment 18 is contiguous with heat exchanger compartment 60 through a freezer duct 64. Thus, air may flow between freezer compartment 18 and heat exchanger compartment 60 via freezer duct 64.

Refrigerator appliance 10 also includes a fresh food fan 66 and a freezer fan 68. Fresh food fan 66 may be positioned at or within fresh food duct 62. Fresh food fan 66 is operable to force air flow between fresh-food compartment 14 and heat exchanger compartment 60 through fresh food duct 62. Fresh food fan 66 may thus be used to create a flow of air across cold side heat exchanger 32 and thereby improve the rate of heat transfer to air within fresh food duct 62. Freezer fan 68 may be positioned at or within freezer duct 64. Freezer fan 68 is operable to force air flow between freezer compartment 18 and heat exchanger compartment 60 through freezer duct 64. Freezer fan 68 may thus be used to create a flow of air across cold side heat exchanger 32 and thereby improve the rate of heat transfer to air within freezer duct 64.

Refrigerator appliance 10 may also include a fresh food damper 70 and a freezer damper 72. Fresh food damper 70 is positioned at or within fresh food duct 62 and is operable to restrict air flow through fresh food duct 62. For example, when fresh food damper 70 is closed, fresh food damper 70 blocks air flow through fresh food duct 62, e.g., and thus between fresh-food compartment 14 and heat exchanger compartment 60. Freezer damper 72 is positioned at or within freezer duct 64 and is operable to restrict air flow through freezer duct 64. For example, when freezer damper 72 is closed, freezer damper 72 blocks air flow through freezer duct 64, e.g., and thus between freezer compartment 18 and heat exchanger compartment 60. It will be understood that the positions of fans 66, 68 and dampers 70, 72 may be switched in alternative exemplary embodiments.

Operation of heat pump system 52 and fresh food fan 66 while fresh food damper 70 is open, allows chilled air from cold side heat exchanger 32 to cool fresh-food compartment 14, e.g., to about forty degrees Fahrenheit (40° F.). Similarly, operation of heat pump system 52 and freezer fan 68 while freezer damper 72 is open, allows chilled air from cold side heat exchanger 32 to cool freezer compartment 18, e.g., to about negative ten degrees Fahrenheit (−10° F.). Thus, cold side heat exchanger 32 may chill either fresh-food compartment 14 or freezer compartment 18 during operation of heat pump system 52. In such a manner, both fresh-food compartments 14 and freezer compartment 18 may be air cooled with cold side heat exchanger 32.

FIGS. 3 through 9 illustrate various exemplary heat pumps 100 and components thereof, and the use of such heat pumps 100 with heat pump system 52, in accordance with exemplary embodiments of the present disclosure. Heat pump 100 shown in FIGS. 3 through 7 may be suitable for use within a linear reciprocating caloric heat pump while heat pump 100 shown in FIGS. 8 and 9 may be suitable for use within a rotatory caloric heat pump. Thus, it will be understood that the present subject matter may be used in or with any suitable heat pump, including linear caloric heat pumps and rotary caloric heat pumps, and the example heat pumps 100 provided herein are not intended to limit the present subject matter to any particular heat pump arrangement.

Figure 8:
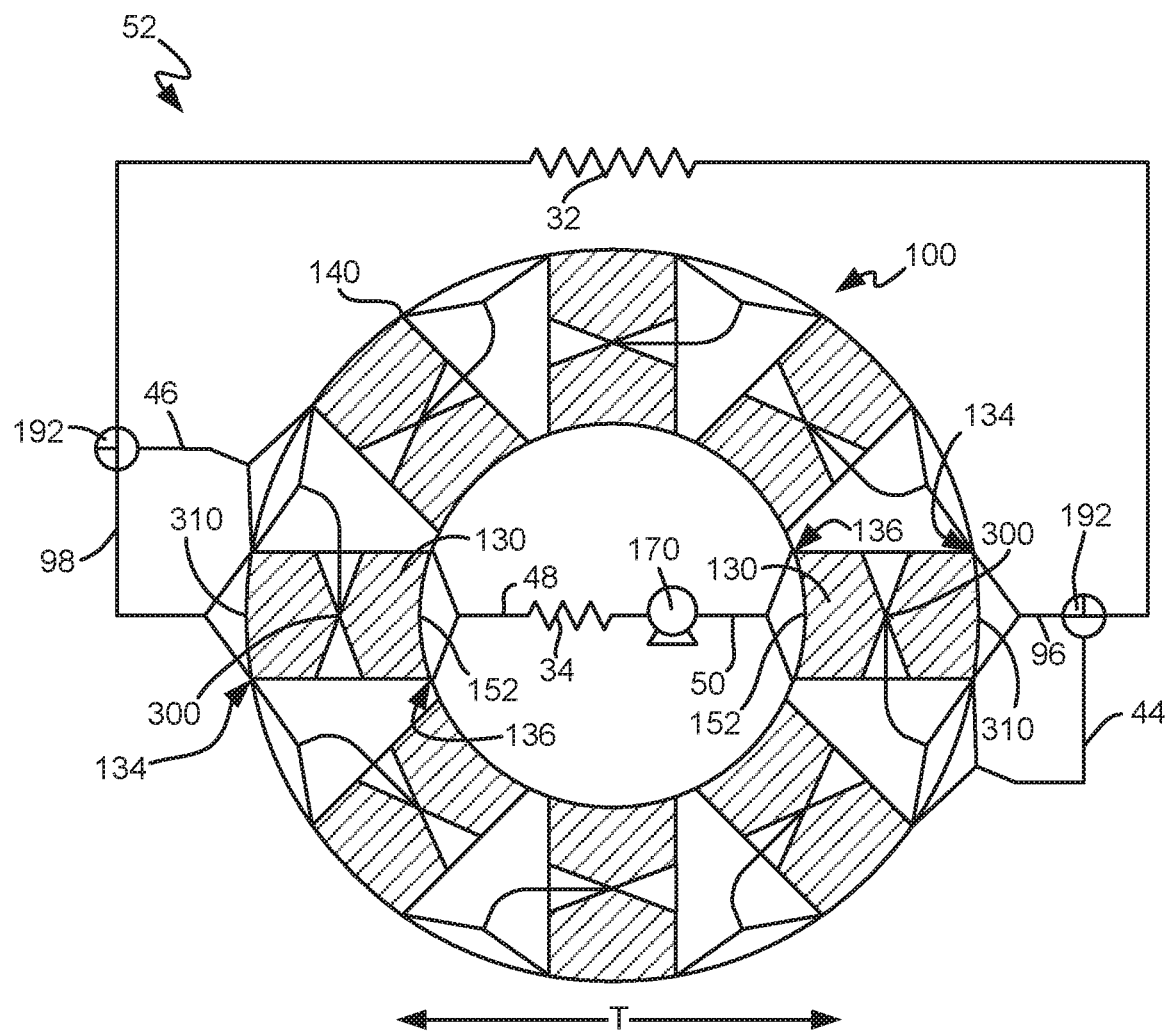
FIGS. 8 and 9 provide schematic views of an exemplary caloric heat pump according to another exemplary embodiment of the present subject matter.
Figure 9:
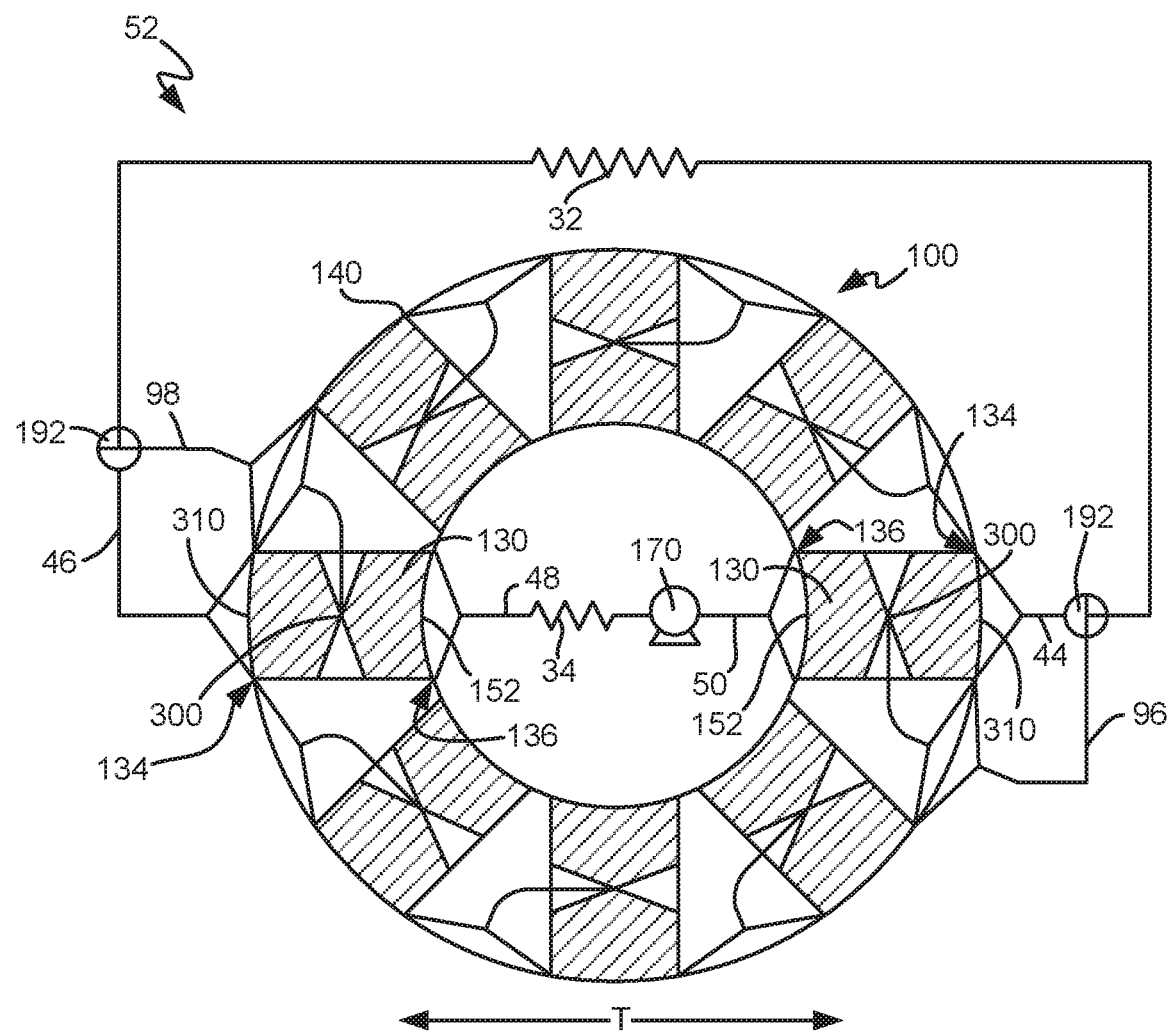

Referring now to heat pump 100 in FIGS. 3 through 6 and FIG. 7, heat pump 100 may include a plurality of stages, each of which includes a magneto-caloric material (MCM). In exemplary embodiments, such MCM stages may be provided in pairs, each of which may for example include a first stage 130 and a second stage 132. Each stage 130, 132 may include one or more different types of MCM. Further, the MCM(s) provided in each stage 130, 132 may be the same or may be different. Stages 130, 132 may be disposed within a regenerator housing 140. Regenerator housing 140 along with stages 130, 132 and optional insulative materials may collectively be referred to as a regenerator assembly. As illustrated, in exemplary embodiments, regenerator housing 140 may include two stages 130, 132. Alternatively, three, four or more stages may be provided in regenerator housing 140. In particular, as shown in FIGS. 8 and 9, heat pump 100 may include a plurality of first stages 130 within regenerator housing 140, e.g., eight first stages 130 uniformly distributed about a rotation axis of heat pump 100.

Each stage 130, 132 may extend between a first end 134 and a second end 136. As discussed herein, working fluid (also referred to herein as heat transfer fluid or fluid refrigerant) may flow through stages 130, 132 during operation of heat pump 100 generally between first and second ends 134, 136 of stages 130, 132. As discussed in greater detail below, heat pump 100 includes features for drawing-off or removing the working fluid from the stage 130, 132 at various locations along a transverse direction T.

Heat pumps 100 also includes one or more magnet assemblies (not shown), each of which creates a magnetic field M (FIG. 10), or other suitable field generators. The regenerator housing 140 and magnet assembly(s) may be movable relative to each other. In exemplary embodiments as shown, for example, regenerator housing 140 is movable relative to the magnet assembly. Alternatively, however, the magnet assembly may be movable relative to regenerator housing 140. Such relative movement between regenerator housing 140 and an associated magnet assembly causes movement of each stage 130, 132 into the magnetic field M and out of the magnetic field M. As discussed herein, movement of a stage 130, 132 into the magnetic field M may cause the magnetic moments of the material to orient and the MCM to heat (or alternatively cool) as part of the magneto-caloric effect. When one of stages 130, 132 is out of the magnetic field M, the MCM may thus cool (or alternatively heat) due to disorder of the magnetic moments of the material.

For example, referring to FIGS. 3 through 7, regenerator housing 140 may be movable linearly between a first position and a second position. In the first position, regenerator housing 140 may be positioned such that first stage 130 disposed within regenerator housing 140 is within the magnetic field M and second stage 132 disposed within regenerator housing 140 is out of the magnetic field M. Notably, being out of the magnetic field M means that second stage 132 is generally or substantially uninfluenced by the magnets and resulting magnetic field M. Accordingly, the MCM of the stage as a whole may not be actively heating (or cooling) as it would if within the magnetic field M (and instead may be actively or passively cooling (or heating) due to such removal of the magnetic field M). In the second position, regenerator housing 140 may be positioned such that first stage 130 disposed within regenerator housing 140 is out of the magnetic field M and second stage 132 disposed within regenerator housing 140 is within the magnetic field M. Similarly, with reference to FIGS. 8 and 9, regenerator housing 140 may also be rotatable such that one portion of stages 130 are within the magnetic field M and the remainder of the stages 130 are out of the magnetic field M in the first position and vice versa in the second position. Movement of a regenerator housing 140 may be caused by operation of motor 26. Motor 26 may be in mechanical communication with regenerator housing 140 and configured for linearly or rotatably moving regenerator housing 140.

Referring also to FIG. 2, in some exemplary embodiments, lines 44, 46, 48, 50, 96, 98 may facilitate the flow of working fluid between heat exchangers 32, 34 and heat pump 100. In exemplary embodiments, lines 44, 46, 48, 50, 96, 98 may facilitate the flow of working fluid between heat exchangers 32, 34 and stages 130, 132 of heat pump 100. For example, a line 44 (e.g., a first cold side working fluid return conduit) may extend between cold side heat exchanger 32 and regenerator housing 140, such that working fluid from an outlet of cold side heat exchanger 32 flows through line 44 to regenerator housing 140. A line 46 (e.g., a first cold side working fluid supply conduit) may extend between regenerator housing 140 and cold side heat exchanger 32, such that working fluid from regenerator housing 140 flows through line 46 to an inlet of cold side heat exchanger 32. A line 50 (e.g., hot side working fluid return conduit) may extend between hot side heat exchanger 34 and regenerator housing 140, such that working fluid from an outlet of heat exchanger 34 flows through line 50 to regenerator housing 140. A line 48 (e.g., hot side working fluid supply conduit) may extend between regenerator housing 140 and hot side heat exchanger 34, such that working fluid from regenerator housing 140 flows through line 48 to an inlet of heat exchanger 34. A line 96 (e.g., a second cold side working fluid return conduit) may extend between cold side heat exchanger 32 and regenerator housing 140, such that working fluid from the outlet of cold side heat exchanger 32 flows through line 96 to regenerator housing 140. A line 98 (e.g., second cold side working fluid supply conduit) may extend between regenerator housing 140 and cold side heat exchanger 32, such that working fluid from regenerator housing 140 flows through line 98 to the inlet of cold side heat exchanger 32. Portions of lines 46, 98 may be contiguous or integral with one another, and portions of lines 44, 96 may also be contiguous or integral with one another.

Notably, check valves 190 may in some exemplary embodiments be provided on the various lines 44, 46, 48, 50, 96, 98 to prevent backflow there-through. Check valves 190, in combination with differential pressures during operation of heat pump 100, may thus generally prevent flow through the improper flow path when working fluid is being actively flowed through heat pump 100. In particular, with reference to the exemplary embodiment shown in FIGS. 3 through 6, check valves 190 are positioned on lines 44, 46, 48, 50, 96, 98 to provide the flow of working fluid shown with solid lines 44, 46, 48, 50, 96, 98 in FIGS. 3 and 5 during the compression stroke of pump 170 and to conversely provide the flow of working fluid shown with solid lines 44, 46, 48, 50, 96, 98 in FIGS. 4 and 6 during the compression stroke of pump 172. Heat pump system 52 may also include a plurality of three-way valves 192 on lines 44, 46, 96, 98. Three-way valves 192 may assist with controlling working fluid flow through either lines 44, 46 or lines 96, 98.

Heat pump system 52 may also include at least one pump, such as pump 170 and/or pump 172, operable to flow the working fluid through lines 44, 46, 48, 50, 96, 98. With reference to FIGS. 3 through 7, first and second pumps 170, 172 may be synchronized such that one of first and second pumps 170, 172 is on a compression stroke while the other of first and second pumps 170, 172 is on a suction stroke. Such synchronization may assist with maintaining a constant volume of working fluid within heat pump system 52. For example, in FIGS. 3, 5 and 7, first pump 170 is shown at a bottom dead center position while second pump 172 is shown at a top dead center position. Conversely, in FIGS. 4 and 6, first pump 170 is shown at the top center position while second pump 172 is shown at the bottom center position. Thus, first and second pumps 170, 172 may be synchronized to operate completely out of phase with one another. With reference to FIGS. 8 and 9, first pump 170 may also operate continuously to flow working through first stages 130 during rotation of regenerator housing 140.

Figure 10:
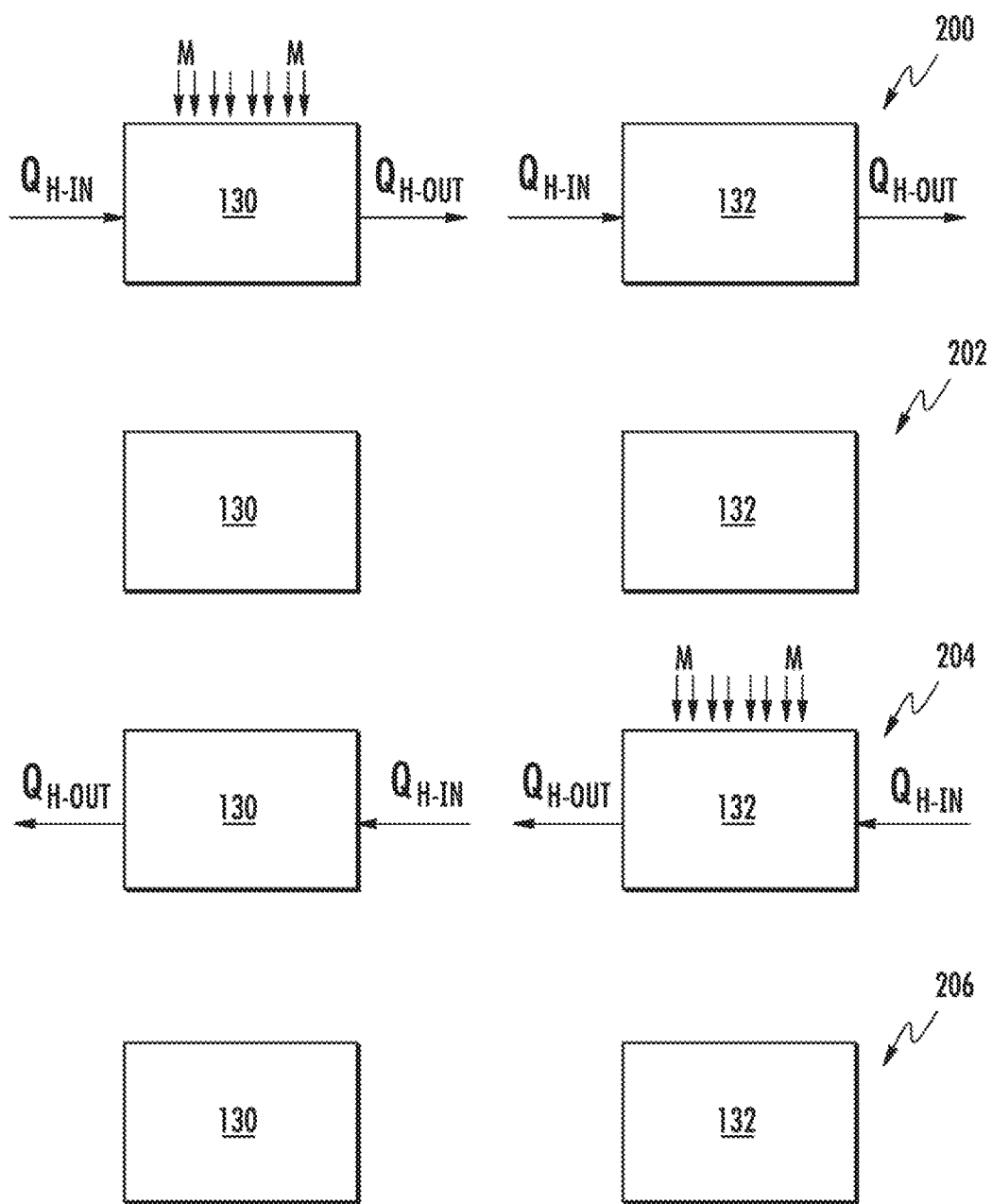
FIG. 10 is a schematic diagram illustrating various positions and movements there-between of MCM stages in accordance with an exemplary embodiment of the present disclosure.

FIG. 10 illustrates an exemplary method of the present disclosure using a schematic representation of associated stages 130, 132 of MCM during dwelling in and movement between the various positions as discussed herein. With regard to first stage 130, during step 200, which corresponds to the first position, stage 130 is fully within magnetic field M, which causes the magnetic moments of the material to orient and the MCM to heat as part of the magneto caloric effect. Further, pump 170 is activated to actively flow working fluid. As indicated by arrow $Q_{H-OUT}$, working fluid in stage 130, now heated by the MCM, can travel out of stage 130 and along line 48 to second heat exchanger 34. At the same time, and as indicated by arrow $Q_{H-IN}$, working fluid from cold side heat exchanger 32 flows into stage 130 from line 44. Because working fluid from cold side heat exchanger 32 is relatively cooler than the MCM in stage 130, the MCM will lose heat to the working fluid.

In step 202, stage 130 is moved from the first position to the second position in the first transition. During the time in the first transition, working fluid dwells in the MCM of stage 130. More specifically, the working fluid does not actively flow through stage 130.

In step 204, stage 130 is in the second position and thus out of magnetic field M. The absence or lessening of the magnetic field is such that the magnetic moments of the material become disordered and the MCM absorbs heat as part of the magnetocaloric effect. Further, pump 172 is activated to actively flow working fluid. As indicated by arrow $Q_{C-OUT}$, working fluid in stage 130, now cooled by the MCM, can travel out of stage 130 and along line 46 to cold side heat exchanger 32. At the same time, and as indicated by arrow $Q_{C-IN}$, working fluid from second heat exchanger 34 flows into stage 112 from line 50 when stage 130 is in the second transition. Because working fluid from second heat exchanger 34 is relatively warmer than the MCM in stage 130, the MCM will lose some of its heat to the working fluid. The working fluid now travels along line 46 to cold side heat exchanger 32 to receive heat and cool refrigeration compartment 30.

In step 206, stage 130 is moved from the second position to the first position in the second transition. During the time in the second transition, the working fluid dwells in the MCM of stage 130. More specifically, the working fluid does not actively flow through stage 130.

With regard to second stage 132, during step 200, which corresponds to the first position, second stage 132 is out of magnetic field M. The absence or lessening of the magnetic field is such that the magnetic moments of the material become disordered and the MCM absorbs heat as part of the magneto-caloric effect. Further, pump 170 is activated to actively flow working fluid. As indicated by arrow $Q_{C-OUT}$, working fluid in stage 132, now cooled by the MCM, can travel out of stage 132 and along line 46 to cold side heat exchanger 32. At the same time, and as indicated by arrow $Q_{C-IN}$, working fluid from second heat exchanger 34 flows into stage 112 from line 50 when stage 132 is in the second transition. Because working fluid from second heat exchanger 34 is relatively warmer than the MCM in stage 132, the MCM will lose some of its heat to the working fluid. The working fluid now travels along line 46 to cold side heat exchanger 32 to receive heat and cool the refrigeration compartment 30.

In step 202, stage 132 is moved from the first position to the second position in the first transition. During the time in the first transition, the working fluid dwells in the MCM of stage 132. More specifically, the working fluid does not actively flow through stage 132.

In step 204, stage 132 is in the second position and thus fully within magnetic field M, which causes the magnetic moments of the material to orient and the MCM to heat as part of the magneto caloric effect. Further, pump 172 is activated to actively flow working fluid. As indicated by arrow $Q_{H-OUT}$, working fluid in stage 132, now heated by the MCM, can travel out of stage 132 and along line 48 to second heat exchanger 34. At the same time, and as indicated by arrow $Q_{H-IN}$, working fluid from cold side heat exchanger 32 flows into stage 132 from line 44. Because working fluid from cold side heat exchanger 32 is relatively cooler than the MCM in stage 132, the MCM will lose heat to the working fluid.

In step 206, stage 132 is moved from the second position to the first position in the second transition. During the time in the second transition, working fluid dwells in the MCM of stage 132. More specifically, the working fluid does not actively flow through stage 132.

Figure 11:
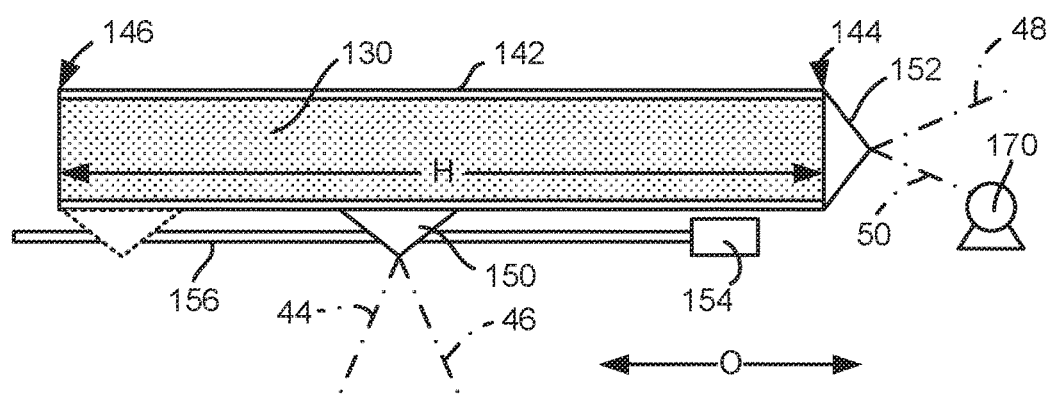
FIG. 11 provides a schematic view of certain components of the exemplary caloric heat pump of the heat pump system of FIG. 2.

FIG. 11 provides a schematic view of certain components of heat pump 100 of heat pump system 52. As discussed in greater detail below, heat pump 100 includes features for drawing working fluid from regenerator housing 140 at a plurality of locations along a length H of first and second stages 130, 132. For example, when heat pump system 52 operates to cool fresh-food compartment 14, the working fluid exits regenerator housing 140 at a first location along the length H of first stage 130. Conversely, the working fluid exits regenerator housing 140 at a second location (different than the first location) along the length H of first stage 130 when heat pump system 52 operates to cool freezer compartment 18. By drawing the working fluid from different locations depending upon which chamber of refrigerator appliance 10 is being cooled by heat pump system 52, heat pump system 52 may operate more efficiently than if the working fluid were drawn from a single location on regenerator housing.

As may be seen in FIG. 11, first stage 130 is disposed within regenerator housing 140. In particular, first stage 130 may have a length H along a longitudinal direction O, e.g., that is parallel to the transverse direction T, within regenerator housing 140. Working fluid is flowable through first stage 130 within regenerator housing 140. Regenerator housing 140 is also connected to cold side heat exchanger 32 such that working fluid is flowable from regenerator housing 140 to cold side heat exchanger 32. In particular, regenerator housing 140 includes a cold side connection 150. Lines 44, 46 are connected to regenerator housing 140 at cold side connection 150. Thus, working fluid is flowable from regenerator housing 140 to an inlet of cold side heat exchanger 32 via line 46 at cold side connection 150, and working fluid is flowable from an outlet of cold side heat exchanger 32 to regenerator housing 140 via line 44 at cold side connection 150.

Regenerator housing 140 is also connected to hot side heat exchanger 34 such that working fluid is flowable between regenerator housing 140 and hot side heat exchanger 34. In particular, regenerator housing 140 also has a hot side connection 152. Lines 48, 50 are connected to regenerator housing 140 at hot side connection 152. Thus, working fluid is flowable from regenerator housing 140 to an inlet of hot side heat exchanger 34 via line 48 at hot side connection 152, and working fluid is flowable from an outlet of hot side heat exchanger 34 to regenerator housing 140 via line 50 at hot side connection 152.

Hot side connection 152 is spaced from cold side connection 150 on regenerator housing 140. For example, hot side connection 152 may be positioned at first end portion 144 of regenerator housing 140, and cold side connection 150 may be positioned between hot side connection 152 and second end portion 146 of regenerator housing 140, e.g., along the longitudinal direction O. Cold side connection 150 is movable, e.g., along the longitudinal direction O, on regenerator housing 140 relative to hot side connection 152. For example, cold side connection 150 may be moved from a first position shown in FIG. 11 to a second position (shown with dashed lines in FIG. 11). By moving cold side connection 150 on regenerator housing 140, cold side connection 150 may draw working fluid from regenerator housing 140 at different locations along the length H of first stage 130. In particular, the working fluid exits regenerator housing 140 at the first position of cold side connection 150 when heat pump system 52 operates to cool fresh-food compartment 14, and the working fluid exits regenerator housing 140 at the second position of cold side connection 150 when heat pump system 52 operates to cool freezer compartment 18.

Cold side connection 150 is closer to hot side connection 152 when cold side connection 150 is in the first position relative when cold side connection 150 is in the second position. Thus, the working fluid may flow through less of the length H of first stage 130 when cold side connection 150 is in the first position compared to when cold side connection 150 is in the second position. In such a manner cooling of the working fluid by first stage 130 may be regulated. In particular, first stage 130 may reduce the temperature of the working fluid more when cold side connection 150 is in the first position compared to when cold side connection 150 is in the second position.

Any suitable method or mechanism may be used to move cold side connection 150 relative to hot side connection 152. For example, heat pump 100 may include a linear actuator 154 coupled to cold side connection 150. Linear actuator 154 is operative to move cold side connection 150, e.g., along the longitudinal direction O, between the first and second positions. In particular, a motor of linear actuator 154 may rotate a rod 156 that is threaded to cold side connection 150 in order to move cold side connection 150. In the exemplary embodiment shown in FIG. 11, heat pump 100 need not include lines 96, 98 in FIG. 11 because cold side connection 150 is movable on regenerator housing 140.

Cold side connection 150 may be moved between the first and second positions depending upon the demand for cooling within refrigerator appliance 10. For example, cold side connection 150 may be positioned at the first position when heat pump system 52 operates to cool fresh-food compartment 14, and cold side connection 150 may be positioned at the second position when heat pump system 52 operates to cool freezer compartment 18. It will be understood that cold side connection 150 may be positioned at any other suitable location in alternative exemplary embodiments. For example, if refrigerator appliance 10 has a deli tray, an icemaker, a cold water dispenser, a quick freezer feature, etc., cold side connection 150 may be positioned at a respective position when heat pump system 52 operates to cool the deli tray, icemaker, cold water dispenser, and/or quick freezer feature.

As may be seen in FIGS. 2 through 9, heat pump system 52 may utilize a single cold side heat exchanger 32 to cool multiple compartments. The movable cold side connection 150 on regenerator housing 140 allows working fluid to be pulled-off at multiple locations when cooling the single cold side heat exchanger 32. By adjusting the location of the movable cold side connection 150, each compartment may be cooled to a respective set temperature. When time-sharing between negative ten degrees Fahrenheit (−10° F.) for the freezer compartment 18 and thirty degrees Fahrenheit (30° F.) for the fresh-food compartment 14, heat pump system 52 may theoretically be fifteen percent more efficient than know single heat exchanger systems. It will be understood that only one of fresh-food compartment 14 and freezer compartment 18 may be actively cooled by heat pump system 52 at any particular time. The speed and/or the duty cycle of heat pump 100 can be programmatically matched to the required load of each compartment with minimal effect on efficiency.

Figure 12:
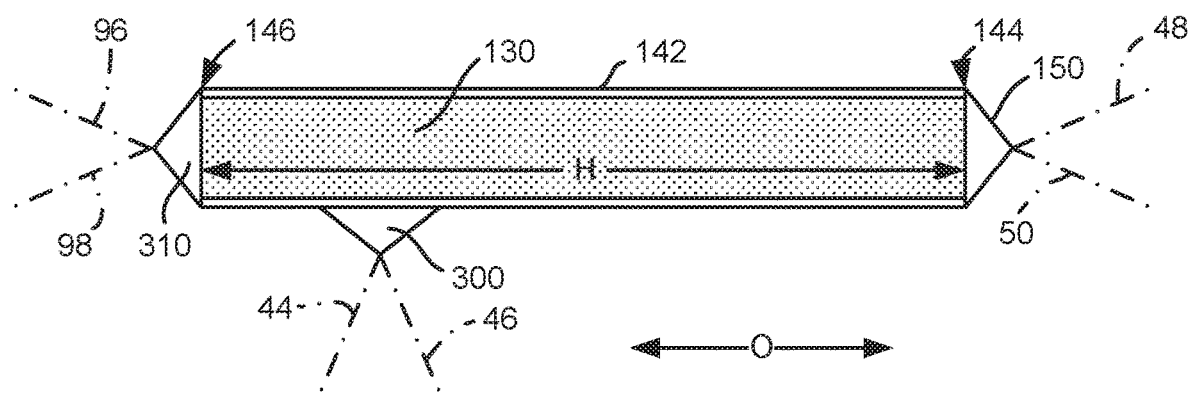
FIG. 12 provides a schematic view of certain components of an exemplary caloric heat pump according to another exemplary embodiment of the present subject matter.

FIG. 12 provides a schematic view of certain components of heat pump 100 according to another exemplary embodiment of the present subject matter. Heat pump 100 includes similar component and operates in a similar manner to that descried above. However, rather than a movable cold side connection, regenerator housing 310 includes a plurality of cold side connections, e.g., a first cold side connection 300 and a second cold side connection 310.

In FIG. 12, lines 44, 46 are connected to regenerator housing 140 at first cold side connection 300. Thus, working fluid is flowable from regenerator housing 140 to an inlet of cold side heat exchanger 32 via line 46 at first cold side connection 300, and working fluid is flowable from an outlet of cold side heat exchanger 32 to regenerator housing 140 via line 44 at first cold side connection 300. In addition, lines 96, 98 are connected to regenerator housing 140 at second cold side connection 310. Thus, working fluid is flowable from regenerator housing 140 to the inlet of cold side heat exchanger 32 via line 98 at second cold side connection 310, and working fluid is flowable from the outlet of cold side heat exchanger 32 to regenerator housing 140 via line 96 at second cold side connection 310. Thus, lines 96, 98 may be in parallel with lines 44, 46.

Figure 3:
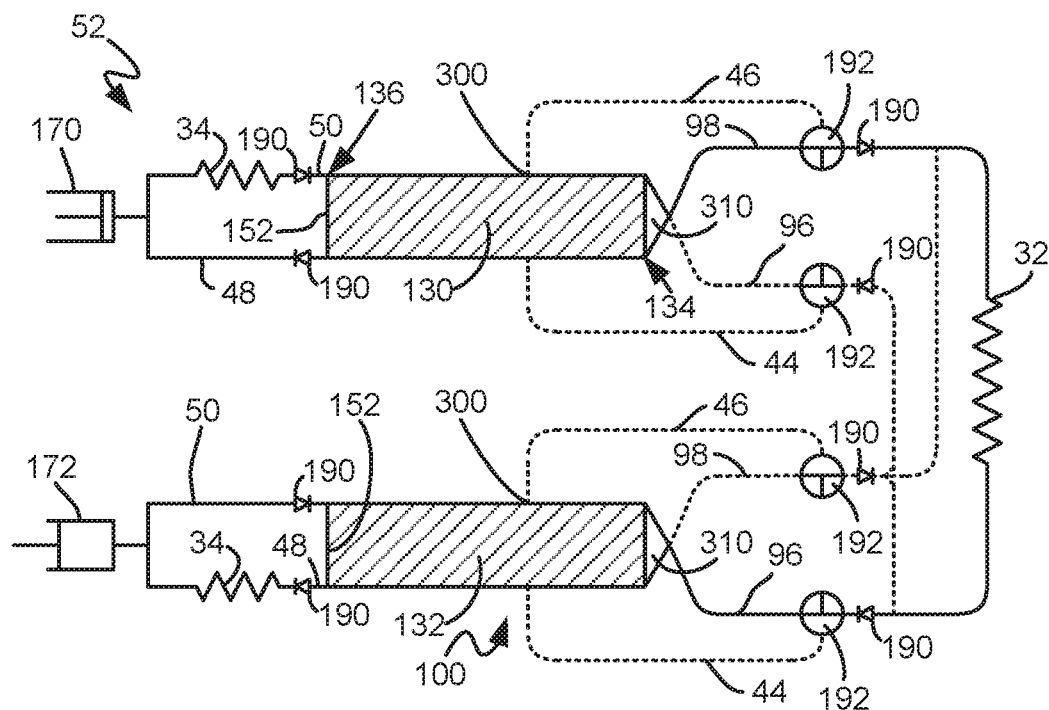
FIGS. 3 and 5 are schematic illustrations of certain components of the heat pump system of FIG. 2, with a first stage of MCM within a magnetic field and a second stage of MCM out of a magnetic field, in accordance with an exemplary embodiment of the present disclosure.
Figure 4:
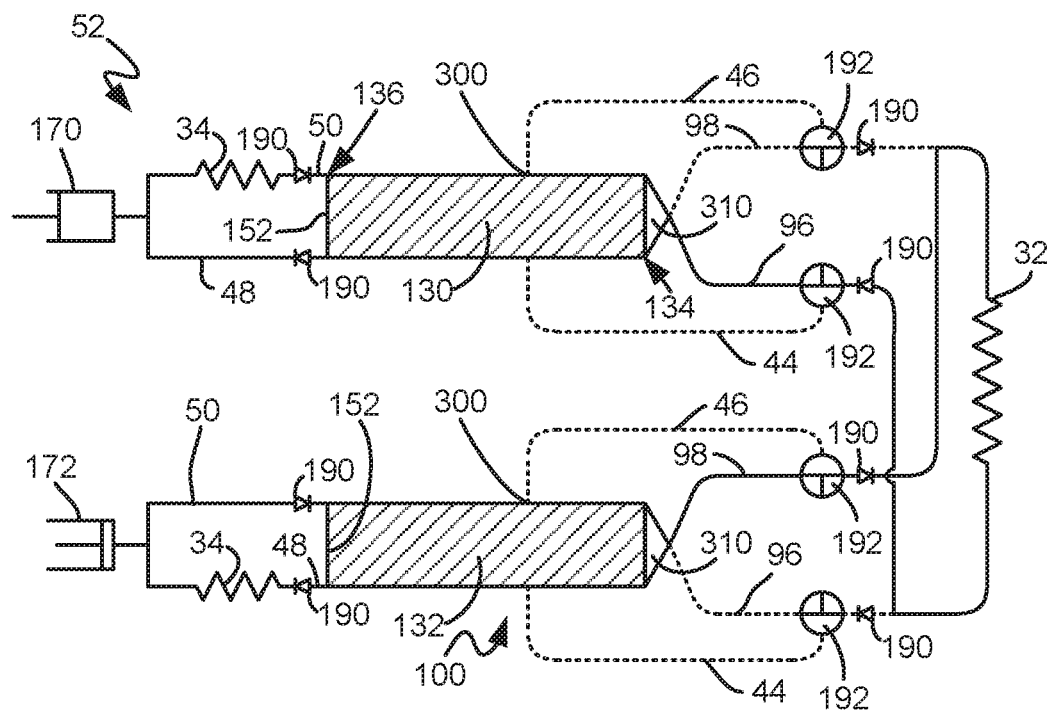
FIGS. 4 and 6 are schematic illustrations of certain components of the exemplary heat pump system of FIG. 2, with the first stage of MCM out of the magnetic field and the second stage of MCM within the magnetic field.

Hot side connection 152 is spaced from first and second cold side connections 300, 310 on regenerator housing 140, e.g., along the longitudinal direction O. For example, hot side connection 152 may be positioned at first end portion 144 of regenerator housing 140, and second cold side connection 310 may be positioned at second end portion 146 of regenerator housing 140. First cold side connection 300 may be positioned between hot side connection 152 and second cold side connection 310, e.g., along the longitudinal direction O. By spacing first and second cold side connections 300, 310 on regenerator housing 140, first cold side connection 300 may draw working fluid from regenerator housing 140 at a different location along the length H of first stage 130 relative to first cold side connection 300. In particular, the working fluid exits regenerator housing 140 at the first cold side connection 300 when heat pump system 52 operates to cool fresh-food compartment 14 (FIGS. 5 and 6), and the working fluid exits regenerator housing 140 at the second cold side connection 310 when heat pump system 52 operates to cool freezer compartment 18 (FIGS. 3 and 4).

Figure 5:
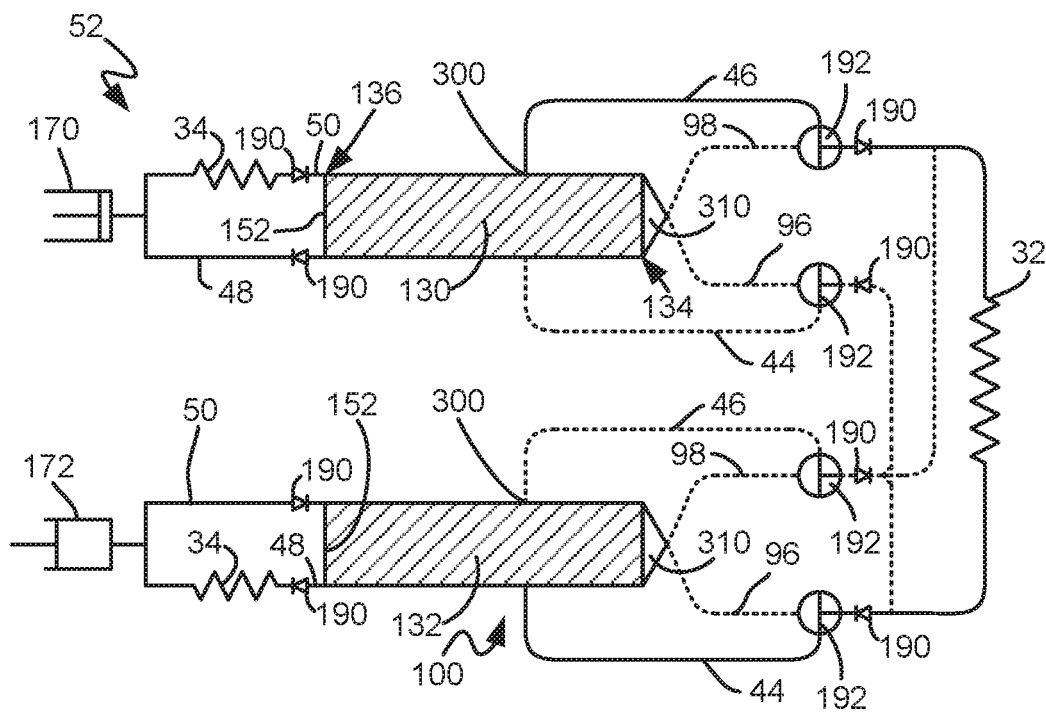
Figure 6:
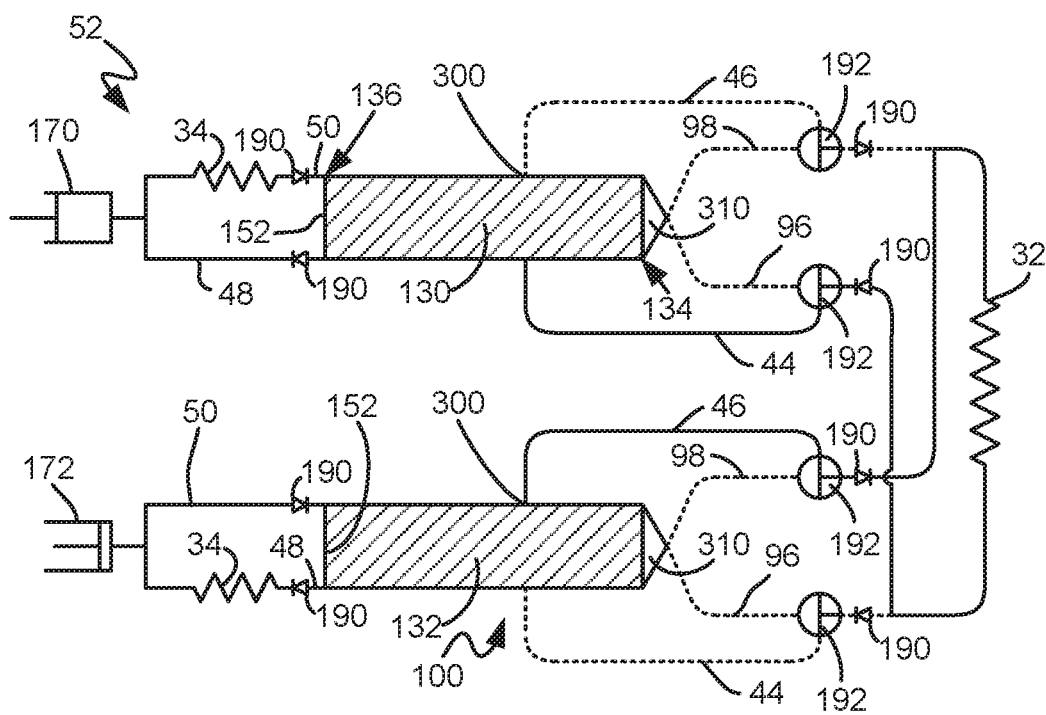
Figure 7:
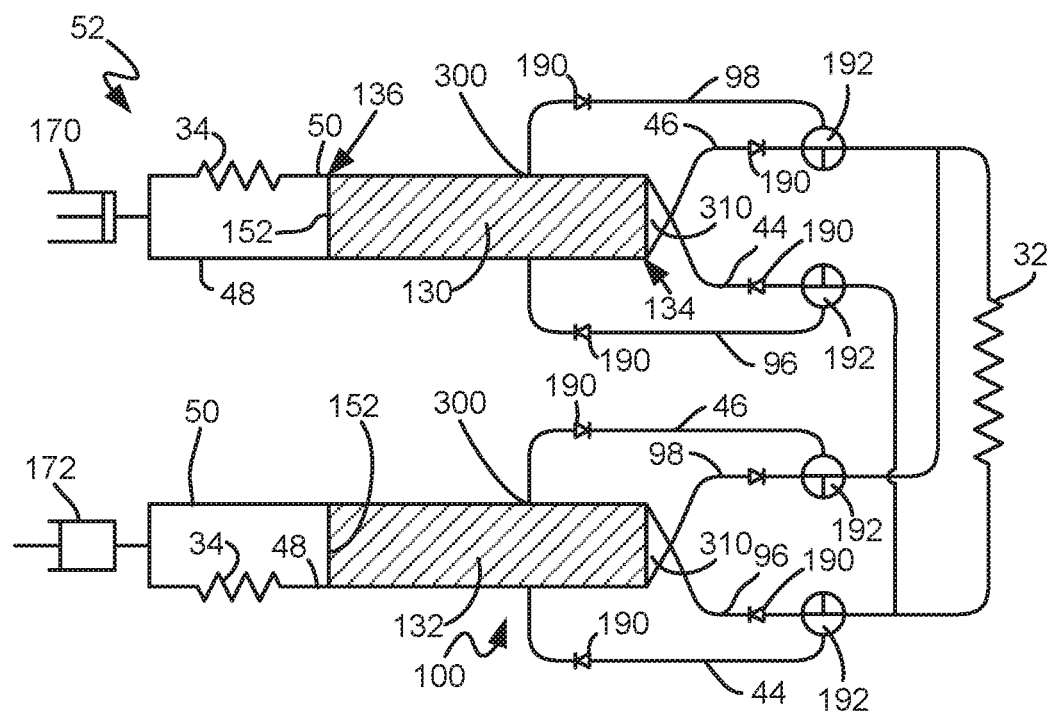
FIG. 7 is a schematic illustration of certain components of the heat pump system of FIG. 2, in accordance with another exemplary embodiment of the present disclosure.

Three-way valves 192 may be used to control working fluid flow through either first cold side connection 300 and/or second cold side connection 310. In particular, with reference to the exemplary embodiment shown in FIGS. 3 through 6, three-way valves 192 (e.g., and check valves 190) are positioned on lines 44, 46, 96, 98 and adjustable to provide the flow of working fluid shown with solid lines 44, 46, 96, 98 in FIGS. 3 and 4 to cool fresh-food compartment 14 and to conversely provide the flow of working fluid shown with solid lines 44, 46, 96, 98 in FIGS. 5 and 6 to cool freezer compartment 18. FIGS. 3 and 5 correspond to a compression stroke of pump 170, and FIGS. 4 and 6 correspond to a compression stroke of pump 172.

First cold side connection 300 is closer to hot side connection 152 than second cold side connection 310, e.g., along the longitudinal direction O. Thus, the working fluid may flow through less of the length H of first stage 130 to first cold side connection 300 compared to second cold side connection 310. In such a manner cooling of the working fluid by first stage 130 may be regulated. In particular, first stage 130 may reduce the temperature of the working fluid more when the working fluid exits regenerator housing 140 at second cold side connection 310 compared to when the working fluid exits regenerator housing 140 at first cold side connection 300. It will be understood that additional cold side connections may be positioned at any other suitable location in alternative exemplary embodiments. For example, if refrigerator appliance 10 has a deli tray, an icemaker, a cold water dispenser, a quick freezer feature, etc., a respective cold side connection may be provided for each additional component of refrigerator appliance.

The multiple cold side connections on regenerator housing 140 allows working fluid to be pulled-off at multiple locations when cooling the single cold side heat exchanger 32. By pulling the working fluid from one of the cold side connections, each compartment may be cooled to a respective set temperature.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator appliance, comprising:
   a cabinet defining a fresh food chamber and a freezer chamber;
   a cold side heat exchanger positioned within the cabinet such that the fresh food chamber and the freezer chamber are chillable with air from the cold side heat exchanger;
   a regenerator housing having a first cold side connection and a second cold side connection, the first cold side connection separate from the second cold side connection on the regenerator housing; and
   a caloric material disposed within the regenerator housing, working fluid flowable through the caloric material within the regenerator housing, wherein the working fluid is flowable from the regenerator housing to the cold side heat exchanger through either the first cold side connection or the second cold side connection, and wherein the first cold side connection is positioned on the regenerator housing such that air at the cold side heat exchanger is about negative ten degrees Fahrenheit when the working fluid from the regenerator housing flows to the cold side heat exchanger through the first cold side connection, the second cold side connection positioned on the regenerator housing such that air at the cold side heat exchanger is about thirty degrees Fahrenheit when the working fluid flows from the regenerator housing to the cold side heat exchanger through the second cold side connection.

2. The refrigerator appliance of claim 1, wherein the regenerator housing extends between a first end portion and a second end portion along a longitudinal direction, the first cold side connection spaced from the second cold side connection along the longitudinal direction on the regenerator housing.

3. The refrigerator appliance of claim 2, further comprising a hot side heat exchanger, the regenerator housing having a hot side connection, the working fluid is flowable from the regenerator housing to the hot side heat exchanger through the hot side connection.

4. The refrigerator appliance of claim 3, wherein the hot side connection is positioned at the first end portion of the regenerator housing, the second cold side connection positioned at the second end portion of the regenerator housing, the first cold side connection positioned between the hot side connection and the second cold side connection along the longitudinal direction.

5. The refrigerator appliance of claim 4, further comprising:
   a first cold side working fluid supply conduit extending between the first cold side connection and an inlet of the cold side heat exchanger;
   a first cold side working fluid return conduit extending between the first cold side connection and an outlet of the cold side heat exchanger;
   a second cold side working fluid supply conduit extending between the second cold side connection and the inlet of the cold side heat exchanger;
   a second cold side working fluid return conduit extending between the second cold side connection and the outlet of the cold side heat exchanger;
   a hot side working fluid supply conduit extending between the hot side connection and an inlet of the hot side heat exchanger; and
   a hot side working fluid return conduit extending between the hot side connection and an outlet of the hot side heat exchanger.

6. The refrigerator appliance of claim 1, further comprising:
   a first cold side working fluid supply conduit extending between the first cold side connection and an inlet of the cold side heat exchanger;
   a first cold side working fluid return conduit extending between the first cold side connection and an outlet of the cold side heat exchanger;
   a second cold side working fluid supply conduit extending between the second cold side connection and the inlet of the cold side heat exchanger; and
   a second cold side working fluid return conduit extending between the second cold side connection and the outlet of the cold side heat exchanger.

7. The refrigerator appliance of claim 1, wherein the cabinet defines a heat exchanger compartment, the cold side heat exchanger positioned within the heat exchanger compartment, the fresh food chamber contiguous with the heat exchanger compartment through a fresh food duct, the freezer chamber contiguous with the heat exchanger compartment through a freezer duct.

8. The refrigerator appliance of claim 7, further comprising a fresh food fan and a freezer fan, the fresh food fan operable to flow air between the fresh food chamber and the heat exchanger compartment through the fresh food duct, the freezer fan operable to flow air between the freezer chamber and the heat exchanger compartment through the freezer duct.

9. The refrigerator appliance of claim 7, further comprising a fresh food damper and a freezer damper, the fresh food damper positioned within the fresh food duct and operable to restrict air flow through the fresh food duct, the freezer damper positioned within the freezer duct and operable to restrict air flow through the freezer duct.

10. The refrigerator appliance of claim 1, wherein the cold side heat exchanger is the only heat exchanger within the refrigerator appliance for chilling the fresh food chamber and the freezer chamber.

11. A refrigerator appliance, comprising:
    a cabinet defining a fresh food chamber and a freezer chamber;
    a cold side heat exchanger positioned within the cabinet such that the fresh food chamber and the freezer chamber are chillable with air from the cold side heat exchanger;
    a hot side heat exchanger;
    a regenerator housing having a first cold side connection and a second cold side connection, the first cold side connection separate from the second cold side connection on the regenerator housing, the regenerator housing also having a hot side connection; and
    a caloric material disposed within the regenerator housing, working fluid flowable through the caloric material within the regenerator housing,
    wherein the working fluid is flowable from the regenerator housing to the cold side heat exchanger through either the first cold side connection or the second cold side connection
    wherein the regenerator housing extends between a first end portion and a second end portion along a longitudinal direction, the first cold side connection spaced from the second cold side connection along the longitudinal direction on the regenerator housing,
    wherein the working fluid is flowable from the regenerator housing to the hot side heat exchanger through the hot side connection, and
    wherein the hot side connection is positioned at the first end portion of the regenerator housing, the second cold side connection positioned at the second end portion of the regenerator housing, the first cold side connection positioned between the hot side connection and the second cold side connection along the longitudinal direction.

12. The refrigerator appliance of claim 11, further comprising:
    a first cold side working fluid supply conduit extending between the first cold side connection and an inlet of the cold side heat exchanger;
    a first cold side working fluid return conduit extending between the first cold side connection and an outlet of the cold side heat exchanger;

a second cold side working fluid supply conduit extending between the second cold side connection and the inlet of the cold side heat exchanger;

a second cold side working fluid return conduit extending between the second cold side connection and the outlet of the cold side heat exchanger;

a hot side working fluid supply conduit extending between the hot side connection and an inlet of the hot side heat exchanger; and a hot side working fluid return conduit extending between the hot side connection and an outlet of the hot side heat exchanger.

13. The refrigerator appliance of claim 11, wherein the cabinet defines a heat exchanger compartment, the cold side heat exchanger positioned within the heat exchanger compartment, the fresh food chamber contiguous with the heat exchanger compartment through a fresh food duct, the freezer chamber contiguous with the heat exchanger compartment through a freezer duct.

14. The refrigerator appliance of claim 13, further comprising a fresh food fan and a freezer fan, the fresh food fan operable to flow air between the fresh food chamber and the heat exchanger compartment through the fresh food duct, the freezer fan operable to flow air between the freezer chamber and the heat exchanger compartment through the freezer duct.

15. The refrigerator appliance of claim 13, further comprising a fresh food damper and a freezer damper, the fresh food damper positioned within the fresh food duct and operable to restrict air flow through the fresh food duct, the freezer damper positioned within the freezer duct and operable to restrict air flow through the freezer duct.

16. The refrigerator appliance of claim 11, wherein the cold side heat exchanger is the only heat exchanger within the refrigerator appliance for chilling the fresh food chamber and the freezer chamber.

17. A refrigerator appliance, comprising:

a cabinet defining a fresh food chamber and a freezer chamber;

a cold side heat exchanger positioned within the cabinet such that the fresh food chamber and the freezer chamber are chillable with air from the cold side heat exchanger;

a regenerator housing having a first cold side connection and a second cold side connection, the first cold side connection separate from the second cold side connection on the regenerator housing;

a caloric material disposed within the regenerator housing, working fluid flowable through the caloric material within the regenerator housing;

a first cold side working fluid supply conduit extending between the first cold side connection and an inlet of the cold side heat exchanger;

a first cold side working fluid return conduit extending between the first cold side connection and an outlet of the cold side heat exchanger;

a second cold side working fluid supply conduit extending between the second cold side connection and the inlet of the cold side heat exchanger; and a second cold side working fluid return conduit extending between the second cold side connection and the outlet of the cold side heat exchanger, wherein the working fluid is flowable from the regenerator housing to the cold side heat exchanger through either the first cold side connection or the second cold side connection.

18. The refrigerator appliance of claim 17, wherein the cabinet defines a heat exchanger compartment, the cold side heat exchanger positioned within the heat exchanger compartment, the fresh food chamber contiguous with the heat exchanger compartment through a fresh food duct, the freezer chamber contiguous with the heat exchanger compartment through a freezer duct.

19. The refrigerator appliance of claim 18, further comprising a fresh food fan and a freezer fan, the fresh food fan operable to flow air between the fresh food chamber and the heat exchanger compartment through the fresh food duct, the freezer fan operable to flow air between the freezer chamber and the heat exchanger compartment through the freezer duct.

20. The refrigerator appliance of claim 17, wherein the cold side heat exchanger is the only heat exchanger within the refrigerator appliance for chilling the fresh food chamber and the freezer chamber.

* * * * *